United States Patent [19]

Muschiatti et al.

[11] Patent Number: 6,037,063
[45] Date of Patent: Mar. 14, 2000

[54] HIGH BARRIER, COEXTRUDED COMPOSITIONS USEFUL IN THE MANUFACTURE OF CLEAR, HEAT-STABLE ARTICLES AND METHODS RELATING THERETO

[75] Inventors: Lawrence C. Muschiatti; I-Hwa Lee, both of Wilmington, Del.

[73] Assignee: E. I. du Pont de Nemours and Company, Wilmington, Del.

[21] Appl. No.: 08/117,846

[22] Filed: Sep. 7, 1993

[51] Int. Cl.[7] .............................. B29D 9/00; B32B 27/08; B32B 27/36; C08J 5/00
[52] U.S. Cl. ..................... 428/480; 428/36.6; 428/36.7; 428/483; 264/241; 264/331.21
[58] Field of Search .................... 428/36.4, 36.6, 428/36.7, 480, 483; 264/241, 331.21

[56] References Cited

U.S. PATENT DOCUMENTS

| | | | |
|---|---|---|---|
| 3,960,807 | 6/1976 | McTaggart | 264/40 R |
| 4,365,036 | 12/1982 | Lee | 524/299 |
| 4,380,621 | 4/1983 | Nield et al. | 528/287 |
| 4,448,913 | 5/1984 | Coleman et al. | 523/396 |
| 4,463,121 | 7/1984 | Gartland et al. | 524/291 |
| 4,705,844 | 11/1987 | Espenschied et al. | 528/278 |
| 4,801,640 | 1/1989 | Dallmann et al. | 524/394 |
| 4,929,482 | 5/1990 | Moritani et al. | 428/36.4 |
| 5,102,943 | 4/1992 | Logullo | 524/487 |

FOREIGN PATENT DOCUMENTS

| | | |
|---|---|---|
| 55-154130 | 12/1980 | Japan . |
| 56-109245 | 8/1981 | Japan . |
| 57-025352 | 2/1982 | Japan . |
| 57-096039 | 6/1982 | Japan . |
| 59-109551 | 6/1984 | Japan . |
| 53143651 | 7/1984 | Japan . |
| WO9001042 | 2/1990 | WIPO . |

*Primary Examiner*—Jeffrey E. Russel

[57] ABSTRACT

The present invention relates generally to multi-layer film compositions which can be thermoformed and heat set into clear, transparent articles, having excellent barrier properties. The compositions comprise at least one barrier layer and at least one polyester layer, whereby the polyester layer will quickly crystallize and heat set into an optically clear layer material.

4 Claims, No Drawings

HIGH BARRIER, COEXTRUDED COMPOSITIONS USEFUL IN THE MANUFACTURE OF CLEAR, HEAT-STABLE ARTICLES AND METHODS RELATING THERETO

FIELD OF THE INVENTION

The present invention relates generally to multi-layer film compositions which can be thermoformed and heat set into clear, transparent, heat resistant articles, having excellent barrier properties, particularly for oxygen or moisture vapor. More specifically, the compositions of the present invention comprise at least one barrier layer [preferably comprising poly(ethylene vinyl alcohol) ("EVOH")] and at least one layer consisting essentially of:

1. polyester base resin,
2. crystallization nucleant, and
3. optionally other additives, whereby the crystallization nucleant and the other additives, if any, meet the following criteria:

1. the nucleating agent and other additives, if any, are miscible with the polyester base resin; or
2. the difference in refractive index of: i) the base resin; and ii) the base resin plus nucleating agent and other additives, if any, is about 0.01 or less.

BACKGROUND OF THE INVENTION

Thermoplastic polyester materials have many commercial applications and are commonly used in fabrics, films and containers. Polyesters are popular due to their strength, flexural characteristics, clarity, thermal stability and food contact characteristics.

Generally speaking however, polyesters do not have the gas barrier and moisture barrier properties of glass or metal, and oftentimes, this limits the usefulness of polyester containers, particularly for "food contact" applications. Furthermore, conventional polyester often "clouds" or becomes opaque when thermoformed and crystalized for high heat resistance. Hence, a need exists in the art for an article having the advantages of polyester, while also providing excellent barrier, optical and heat resistance properties.

SUMMARY OF THE INVENTION

The present invention is directed to multi-layer composite film or sheet structures comprising at least one polyester layer of a particular polyester composition and at least one barrier layer. The barrier layer preferably comprises ethylene vinyl alcohol polymer ("EVOH"). The resulting laminate can be processed, particularly by thermoforming, into articles having advantageous barrier properties, optical properties, heat stability, tensile strength, flexibility and process cycle times.

The Polyester Structural Layer

The preferred polyesters useful as part of a structural layer for the present invention include: 1. poly(ethylene terepthalate) ("PET"); 2. PET modified by incorporating diacids other than terephthalic acid (such as isopthalic acid) or glycols other than ethylene glycol (such as cyclohexane dimethanol ("CHDM")); 3. copolymers containing terepthalic acid, CHDM and other dibasic acids such as isopthalic acid; and 4. poly(ethylene napthalate) ("PEN") and derivatives thereof.

The polyesters used according to the present invention should be thermoplastic and crystallizable, having a glass transition temperature ("Tg") of at least 50° C., and a melting point of at least 150° C. The more preferred polyesters will have a melting point of at least 200° C. The most preferred polyester is PET and derivatives thereof.

The polyesters useful in accordance with the practice of the present invention are generally obtained by known polymerization techniques from aromatic dicarboxylic acids, preferably the lower alkyl esters thereof such as the dimethyl ester of terephthalic acid. The aromatic dicarboxylic acid or its ester or anhydride is esterified or trans-esterified and polycondensed with a saturated diol such as ethylene glycol. Typical saturated diols include saturated aliphatic, cyclo-aliphatic, or aromatic diols, preferably the lower alkane-diols such as ethylene glycol. Mixtures of aliphatic carboxylic acids and saturated diols may also be used, but the above described physical properties (i.e., melting point and glass transition temperature) must generally be satisfied.

The polyesters should also have an appropriate molecular weight to obtain desired flexural characteristics; in terms of its intrinsic viscosity (IV), the polyester should have an IV of at least about 0.5 as measured in a 1:1 by weight solution of methylene chloride and trifluoroacetic acid. Preferably, the minimum intrinsic viscosity will be above about 0.65, and the most preferred polyesters will have an intrinsic viscosity of at least about 0.85. The polyester base resin preferably is present in an amount of about 79–99wt % based upon the total weight of the formulations used in the practice of this invention. A single polyester material need not be used, and copolyesters, blends, etc. may alternatively be used.

Nucleating Agent

The present invention is also directed to the use of a nucleating agent which is preferably miscible with the PET base resin. "Miscibile" as used herein is intended to describe the final composition after it has been thermoformed and heat set, whereby the final composition has not phase-separated to form a heterogeneous mixture of base resin and nucleant, or in other words, the final (thermoformed, heat set) composition is a single phase solid solution. However, amorphous and crystalline phases can coexist in the otherwise homogenous mixture. The existence of a single phase can be determined by measuring optical clarity—a single phase will not diffract incident light or otherwise cause the composition to be opaque.

A substantially non-miscible nucleating agent can be used, provided the phase-separated final material has an index of refraction which differs from the base polyester polymer by about 0.01 or less. "Refractive index" is the ratio of the velocities of light in a medium and in air under the same conditions. The refractive index is measured by the ratio of the sines of the angles of incidence and refraction and is determined by a conventional refractometer by conventional methods. Numerous references are available which provide the refractive index of various materials.

A rapid method of estimating the effectiveness of a nucleating agent is to mix approximately equal amounts of PET and the agent in a DSC (Differential Scanning Calorimeter) cup and determine the peak crystallization temperature of the mixture on cooling from the melt by DSC. A more precise method of determining effectiveness is to mix known quantities of PET and nucleating agent, blend the mixture by melt extrusion, and determine the peak crystallization temperature of the product by DSC.

The preferred crystallization nucleant is a polyester-based nucleant which is miscible with the PET base resin and comprises alkali metal salts of polyester polymers having a number average molecular weight of at least about 1,000. The most preferred polyester based nucleants are the sodium and potassium salts.

Preferably, the "metal salt" polyester nucleating agent is formed first and then contacted with the polyester to be nucleated. Formation of the nucleating agent outside the PET is most preferred, since it provides relatively stable PET molecular weights.

For a given alkai metal, the alkali metal concentration (or weight percent of nucleant) will vary according to the processing parameters of any particular process. When sodium is used, the concentration of sodium in the compositions of the present invention will be at least 15 parts per million ("ppm") or about $6.5 \times (10)^{-7}$ gram-atoms of active sodium per gram of polyester base resin, and the maximum concentration of sodium being about 340 ppm sodium or about $15 \times (10)^{-6}$ gram atoms of active sodium per gram of polyester base resin.

The actual weight percent alkali metal containing nucleating agent in the compositions of the present invention will depend upon the alkali metal, the atomic number of the alkali metal and the level of active alkali metal in the nucleant.

Where the base polyester has an extremely low crystalization rate, such as with polyesters having high loadings of comonomers, the nucleating agent can be added to levels above 20% by weight, if necessary. Normally however, the nucleating agent is used to an upper limit of about 20% by weight, and it is generally preferred that no more than about 12% by weight of the total composition is nucleant, since the addition of nucleant above about 12 weight percent generally does not improve the properties of the article and to some degree adverse effects may be observed, such as product haze or the like. When the alkali metal is sodium and the active sodium is present in the nucleant at 1500 ppm, the nucleating agent may be added up to about 12% by weight of the total composition, although 2% to about 7.5% is the preferred range.

Other useful nucleating agents can include the sodium or potassium salts of hydrocarbon carboxylic acids containing between about 7 and 25 carbon atoms, preferably greater than 12 carbon atoms. Representative of these acids (which are fatty acids) are stearic, pelargonic, and behenic acid.

The low molecular weight of these fatty acid salt nucleants enables the incorporation of relatively high levels of sodium or potassium into the final composition using relatively low weight amounts of nucleating agent. Hence, although these fatty acid salts may not be completely miscible with the polyester base polymer and although they may exhibit a refractive index which is non-identical with the base polymer, these fatty acid salts can be acceptable, due to the low loadings necessary to achieve an acceptable crystallization rate.

Other useful nucleating agents include the sodium or potassium salts of carboxyl containing organic polymers, such as copolymers of olefins and acrylic or methacrylic acids, or copolymers of aromatic olefins and maleic anhydride. This class of nucleants includes the sodium or potassium salt of stearic acid; the sodium or potassium salt of ethylene/methacrylic acid copolymers (including both wholly or partially neutralized salts e.g., at least about 30% neutralized), the sodium salt of styrene/maleic anhydride copolymers (including both wholly or partially neutralized salts e.g., at least about 30% neutralized) and sodium versatate. In the copolymers listed above, the olefin or aromatic olefin moiety ordinarily comprises 50–98 percent by weight of the copolymer, and preferably 80–98 percent.

Barrier Layer

The preferred barrier layer composition is EVOH copolymer, preferably comprising about 20–55 mole percent ethylene units, more preferably about 25 to 50 mol % ethylene. If the ethylene percentage is less than this range, moisture resistance generally decreases and this can lead to poor gas barrier properties under high-humidity conditions. If the ethylene percentage is above the preferred range, gas barrier properties generally diminish under low-humidity conditions, although moisture resistance is generally improved.

The EVOH copolymer should have an intrinsic viscosity in the range of about 0.001 to about 10 l/g as measured in a mixed solvent composed of 85 wt % of phenol and 15 wt % of water at 30° C. However, with an intrinsic viscosity lower than 0.07 l/g, the copolymer generally exhibits poor mechanical properties, and with an intrinsic viscosity higher than 0.17 l/g, the copolymer may gel at the time of melt forming.

Alternatively, the barrier layer can comprise poly (vinylidene chloride) ("PVDC"), poly(vinyl fluoride), poly (vinylidene fluoride), and the like. Indeed, virtually any barrier-type material and its blends can be used as part of the barrier layer, provided optical properties are not detrimentally effected.

Barrier Layer+Polyester Structural Layer

The laminates of the present invention may have any one of the following structures:

a. barrier layer/structural layer,
b. structural layer/barrier layer/structural layer,
c. structural layer/barrier layer/structural layer/barrier layer/structural layer;
d. structural layer/barrier layer/barrier layer/structural layer; and
e. combinations, derivations or multiples of the above, (with or without adhesive tie layers);
f. one or more of the structural layers may also be a sealant layer.

Although a single polyester structural layer and a single barrier layer would be appropriate for the present invention, more preferably, the barrier layer is placed between two structural layers (the structural films can be the same or different), preferably bound together by adhesives. The laminate should have a thickness in the range of about 6–120 mils, more preferably in the range of about 30–80 mils. The barrier layer(s) should have a thickness of at least about 1 mil, more preferably at least about 4 mils. Preferrably, the thickness of the barrier layer(s) should be about 2.5–15% of the overall thickness of the sheet or film, more preferrably about 5–10%.

The laminate may be formed by any known method such as coextrusion, coinjection, extrusion lamination, and coating (i.e. coating the structural layer with a barrier resin solution or coating the barrier layer with a structural layer solution). In the case of coextrusions, multiple extruders are preferably used, one for each barrier layer, and others for each structural (and adhesive, if any) layer. The extrudates from the extruders are preferably combined together in a coextrusion die which then forms the laminate. Alternatively, the film layers can be fused together using heat, or held together by any one of a variety of adhesive resins.

In general, adhesive resins for tying film layers together are thermoplastic polymers having carbonyl groups derived from functional groups of free carboxylic acids, carboxylic acid salts, carboxylic acid esters, carboxylic acid amides, carboxylic anhydrides, carbonic acid esters, urethanes, ureas or the like.

Suitable adhesive resins include polyolefins modified with at least one ethylenically unsaturated monomer selected from unsaturated carboxylic acids and anhydrides, esters and amides thereof, especially polypropylene, high density polyethylene, linear low density polyethylene, very low density polyethylene, ethylene-acrylate, ethylene acid copolymers, low density polyethylene and ethylene-vinyl acetate copolymers modified with at least one member selected from acrylic acid, methacrylic acids, crotonic acid, fumaric acid, itaconic acid, maleic anhydride, itaconic anhydride, citraconic anhydride, ethyl acrylate, methyl methacrylate, ethyl maleate, 2-ethylhexyl acrylate, acrylamide, methacrylamide, fatty acid amides, and imides of the acids described above.

The adhesive can also be prepared from an ethylene polymer and a second polymer grafted with maleic anhydride. In addition, as the adhesive resin, there can be used ethylene-acrylate copolymers, ionomers, ethylene-propylene, and ethylene-propylene-diene, polyalkylene oxide-polyester block copolymers, carboxymethyl cellulose derivatives, tackifiers and blends of these polymers with polyolefins.

Other suitable adhesives include poly(ester-amides) derived from diamines, aliphatic acids, and aliphatic glycols.

Process for Manufacturing Clear, Heat Stable, Polyester Articles

The preferred process of the present invention is directed to the use of the multilayer coextruded films or sheets described above. To obtain a clear, transparent, heat stable product, the polyester layer(s) must crystallize, and the polyester polymer must be oriented prior to the onset of crystallization. The orientation (of the polyester) results in the formation of elongated crystallites. Such elongated crystallites allow incident light to pass without substantial diffraction, resulting in a clear, transparent, crystallized product. Polyesters can be oriented by deforming the polyester at temperatures slightly higher than the Tg of the polyester. In the case of PET, this orientation temperature range is about 80° C. to 95° C.

The crystallization of unoriented polyester, in the presence or absence of crystallization promoters, will yield a spherulitic crystalline morphology, i.e., spherulitic crystallites which diffract light, thereby causing the crystallized polymer to become opaque. Orientable polyester polymers nucleated with compatible (polyester based and/or sodium or potassium salts of hydrocarbon acids) chemically reactive nucleants can be oriented and crystallized at economically practical rates, (thermoforming cycle times of from about 5 to 11 seconds) to produce clear, transparent articles over a wide range of nucleant concentrations.

The oriented formed article can then be heat set by conventional or nonconventional methods. This heat setting must be done at a temperature of at least 93° C. and preferably between 135° C. to 190° C., depending on the degree of crystallinity and thermal stability desired.

It was expected that barrier layers (and adhesive tie layers) would not deform or thermoform in the orientation temperature range for polyesters (about 80° C. to 95° C. for PET) without crazing or fracturing. Crazing or fracturing of the barrier layer would be detrimental to both the optical and barrier properties of the finished article. Unexpectedly it was found that some barrier materials, specfically EVOH polymers over a broad range of compositions, could be thermoformed to the high depth to diameter draw ratios required for polyester orientation in the polyester orientation temperature range without crazing or fracturing. It was also discovered that in some cases, where crazing of the barrier layer occurred during orientation, subsequent heat setting to form the finished article resulted in the fusion of these crazes. As a result, barrier layers and tie layers can be extruded with polyester structural layers and thermoformed in a process consisting of (1) low temperature orientation at high draw ratios (depth to diameter) and (2) high temperature forming and heat setting, to produce clear, transparent heat stable articles with significantly enhanced barrier properties.

Barrier layers can be chosen (and tie layers, if any) which are not detrimental to the optical properties of the finished articles. This is true of poly(ethylene vinyl alcohol) ("EVOH"), poly(vinylidene chloride) ("PVDC"), poly(vinylidene fluoride) ("PVDF") etc. and is particularly true of EVOH and grafted polyolefin adhesive layers (anhydride or carboxylic acid).

The multilayer compositions of the present invention can be thermorformed or otherwise heat processed by conventional (or non-conventional) processes, provided the process includes an orientation step prior to a forming step. The oriented formed article can then be heat set by conventional or non-conventional methods. Such processing of the multilayer structures of the present invention encompasses practical and commercially useful cycle times and produces heat resistant, clear, transparent polyester article.

Articles can be manufactured using the resin compositions and orientation/heat set processes of the present invention. The particular articles of manufacture for the present invention include thin-walled thermoformed articles.

After the forming process, the article is preferably annealed or heat-set under restraint. The annealing or heat-setting is the known technique of heating the article so as to develop the crystallinity and minimize amorphous orientation. This is performed while the article is restrained, preferably in the mold itself, so that its desired shape is maintained. This heat setting must be done at a temperature of at least 93° C. and preferably between 135° C.–190° C. The heat setting conditions should be selected on the basis of the appropriate degree of crystallinity and thermal stability desired.

EXAMPLES

Materials of Construction

Nucleated Poly(ethylene terepthalate)—Poly(ethylene terepthalate) homopolymer, 0.80 IV, nucleated with a sodium salt of a polyester polymer.

Amorphous Poly(ethylene terepthalate)—Copolymer of poly(ethylene terepthalate), nominal 250° C. melting point and 0.70 IV.

| Poly(ethylene vinyl alcohol) Polymers | | | | |
|---|---|---|---|---|
| EVOH Type | Mole % Ethylene | Density (g/cc) | Melt Temp (° C.) | Melt Flow Rate (g/10 min) |
| EVOH 1 | 32 | 1.2 | 183 | 3 |
| EVOH 2 | 32 | 1.2 | 183 | 3.5 |
| EVOH 3 | 44 | 1.15 | 168 | 12 |

Adhesives—Ethylene copolymers containing a temperature stable ester and anhydride functionality.

| Nominal Data | | | |
|---|---|---|---|
| | A1 | A2 | A3 |
| Density, g/cc | 0.928 | 0.931 | — |
| Melt Index @ 190° C. | 6.5 | 2.8 | 4.6 |
| Melting Point,° C. | 82 | 85 | — |
| Freezing Point,° C. | 66 | 62 | — |

Example 1

The Structure

Nucleated/A2/EVOH1/A2/Amorphous PET PET (0.0070"/0.0010"/0.0014"/0.0008"/0.0077")—Gauges was coextruded into sheet form using the extruder temperature profile, ° F.:

| | |
|---|---|
| Nucleated PET | 450/500/550/550/550/550-550 (Head) |
| A2 | 400/475/475/475/475-475 |
| EVOH 1 | 400/400/425/425/425-430 |
| Amorphous PET | 500/500/520/520/520-530 |

Combining Block: 530° F.

Die: 550° F.

The resulting coextruded sheet was solid phase pressure formed at a depth to diameter draw ratio of 0.5, over a wide range of forming temperatures. The results are shown in Table 1.

TABLE 1

Solid Phase Pressure Forming of Coextruded Sheet

| Forming Temp.<br>° C. (° F.) | Visual and Optical Microscope Observations |
|---|---|
| 68(155) | Clear, No EVOH Breaks |
| 74(165) | Clear, No EVOH Breaks |
| 79(175) | Clear, No EVOH Breaks |
| 85(185) | Clear, Two EVOH Breaks |

This example illustrates the ability to form EVOH, as a coextruded phase, at temperatures included within the orientation temperature range of PET.

Example 2

The coextruded sheet described in Example 1 was blown into a preform at a depth to diameter draw ratio of 1.7 to 1, then heat set into a container with a final draw ratio of approximately 1.3 to 1. The effect of a 90° C. (194° F.) forming termperature and various heat set temperatures on the integrity of the barrier layer is given in Table 2. This example illustrates the ability to produce clear, heat set containers, from coextruded compositions, at temperatures included within the temperature range required to produce PET articles with a high degree of thermal stability.

TABLE 2

Integrity of EVOH 1 Barrier Layer In Deep Drawn, Oriented Containers
Preform Forming Temperature: 90° C.
Perform Draw Ratio: 1.7 to 1
Container Draw Ratio: 1.3 to 1

| Heat Set | | Observations - Heat Set Container | | | |
|---|---|---|---|---|---|
| | | Visual | | Microscopic (320X) | |
| Temp.<br>° C. (° F.) | Time<br>Seconds | Sidewall | Base | Sidewall | Base |
| — | — | Clear to Sl. Woodgrain | Sl. Haze | — | — |
| 171 (340) | 13.5 | Some Striations | Clear | 0.0003"–0.0005"<br>Sl. Undulation | 0.002"<br>Sl. Crazing |
| 182 (360) | 13.5 | Some Striations | Clear | — | 0.0002"<br>Clear |
| 193 (379) | 13.5 | Sl. Striations | Clear | — | 0.0002"<br>Very Uniform and Clear |
| 204 (400) | 13.5 | — | Clear | — | 0.0003"<br>Very Uniform |

Example 3

Three (3) PET/adhesive/EVOH combinations were coextruded (gauges shown are nominal values):

Example 3.1

| Nucleated PET | A2 | EVOH 1 | A2 | Nucleates PET |
|---|---|---|---|---|
| (0.018") | (0.001") | (0.002") | (0.001") | (0.018") |

Example 3.2

| Nucleated PET | A2 | EVOH 1 | A2 | Nucleates PET |
|---|---|---|---|---|
| (0.018") | (0.001") | (0.002") | (0.001") | (0.018") |

Example 3.3

| Nucleated PET | A2 | EVOH 1 | A2 | Nucleates PET |
|---|---|---|---|---|
| (0.018") | (0.001") | (0.002") | (0.001") | (0.018") | using the temperature profiles:

Example 3.1

| Extruder, °F. | Nucleated PET | A2 | EVOH 1 | Nucleated PET |
|---|---|---|---|---|
| Z1 (feed) | 500 | 400 | 400 | 500 |
| Z2 | 520 | 475 | 430 | 520 |
| Z3 | 520 | 475 | 430 | 520 |
| Z4 | 520 | 475 | 430 | 520 |
| Z5 | 520 | — | — | — |
| Melt Temp,° F. | 542 | 481 | 433 | 526 |

| | |
|---|---|
| Combining Block,° F. | 530 |
| Die, ° F. | 550 |
| Chill Roll - Primary,° F. | 90 |
| Chill Roll - Secondary,° F. | 80 |
| Line Speed, fpm | 10 |

Example 3.2

| Extruder, °F. | Nucleated PET | A2 | EVOH 2 | Nucleated Pet |
|---|---|---|---|---|
| Z1 | 500 | 450 | 400 | 500 |
| Z2 | 520 | 475 | 430 | 520 |
| Z3 | 520 | 475 | 430 | 520 |
| Z4 | 520 | 475 | 430 | 520 |
| Z5 | 520 | — | — | — |
| Melt Temp,° F. | 542 | 482 | 423 | 525 |

| | |
|---|---|
| Combining Block,° F. | 530 |
| Die,° F. | 550 |
| Chill Roll - Primary,° F. | 90 |
| Chill Roll - Secondary,° F. | 80 |
| Line Speed, fpm | 10 |

Example 3.3

| Extruder, °F. | Nucleated PET | A1 | EVOH 3 | Amorphous PET |
|---|---|---|---|---|
| Z1 | 500 | 400 | 390 | 500 |
| Z2 | 520 | 450 | 390 | 520 |
| Z3 | 520 | 450 | 390 | 520 |
| Z4 | 520 | 450 | 390 | 520 |
| Z5 | 520 | — | — | — |
| Melt Temp,° F. | 543 | 465 | 391 | 530 |

| | |
|---|---|
| Combining Block,° F. | 520 |
| Die,° F. | 520 |
| Chill Rolls - Primary,° F. | 80 |
| Secondary,° F. | 90 |
| Line Speed, fpm | 15.5–16.5 |

These coextruded sheets were blown into preforms at a depth to diameter ratio of approximately 1.7 to 1 using selected sheet temperatures during the preforming process. Selected preforms were then heat set on a mandrel for twenty seconds. The temperature of the mandrel was 360° F. (182° C.). The depth to diameter ratio of the heat set container was 1.3 to 1.

The effect of the sheet temperature during the preforming process on the clarity of the preform and final heat set container is shown in Table 3.

The ability to form a clear oriented (PET) container from PET/Adhesive/EVOH coextruded sheet, by first orienting the sheet in the orientation temperature range of PET is evident from Table 3. For each coextruded construction, a range exists, within the orientation temperature range of PET, where a clear, heat stable product was formed. In some cases, faults observed in the preform were removed during the heat set process.

This example illustrates the ability to thermoform clear, heat stable articles, from a variety of coextruded compositions consisting of PET and EVOH, where the process includes and orientation step at low temperatures and a heat set step at a higher temperature.

TABLE 3

Forming of Containers From Coextruded Sheet - Preforming at Orientation Temperatures

| Sheet Temp. During Preforming °F. (° C.) | Mandrel Temp. °F. (° C.) | Final State | Visual Observations Sidewall | Bottom |
|---|---|---|---|---|
| Construction: Example 3.2 | | | | |
| 190 (88) | — | Preform | Cloudy Preform Only | Very Cloudy Partially Drawn |
| 190 (88) | 360 (182) | Container | Very Clear w some Flow Lines | Very Clear |
| 197 (92) | — | Preform | Cloudy Preform Only | Clear Partially Drawn |
| 197 (92) | 360 (182) | Container | Very Clear w Minor Flow Lines | Very Clear |
| 203 (95) | 360 (182) | Container | Very Clear w Minor Flow Lines | Very Clear |
| Construction: Example 3.1 | | | | |
| 188 (87) | — | Preform | Cloudy Preform Unevenly Drawn | Very Cloudy |
| 195 (91) | — | Preform | Clear Preform Unevenly Drawn | Slight Haze |
| 202 (94) | — | Preform | Slight Haze | Clear |
| 209 (98) | — | Preform | Clear w Some Flow Lines | Clear |
| 209 (98) | 360 (182) | Container | Clear w Some Flow Lines | Clear |
| Construction: Example 3.3 | | | | |
| 186 (86) | — | Preform | Clear w Flow Lines | Clear w Flow Lines |
| 185 (86) | 360 (182) | Container | Clear w Flow Lines | Clear w Flow Lines |
| 191 (88) | — | Preform | Clear w Flow Lines | Clear w Flow Lines |
| 192 (88) | 360 (182) | Container | Clear w Flow Lines | Clear |
| 204 (96) | — | Preform | Clear w Flow Lines | Clear w Flow Lines |
| 204 (96) | 360 (182) | Container | Clear w Flow Lines | Clear |

We claim:
1. A multi-layer composition comprising:
   a) a barrier layer; and
   b) a structural layer comprising:
      i) about 79 to about 99 weight parts thermoplastic crystallizable or crystalline polyester base resin having a glass transition temperature ("Tg") of at least about 50° C., and a melting point of at least about 150° C. and an intrinsic viscosity (IV) of at least about 0.5; and ii) an alkali metal salt of a polyester polymer in an amount sufficient to provide the structural layer with about $6.5 \times 10^{-7}$ gram-atoms to about $15 \times 10^{-6}$ gram-atoms of active alkali metal per gram of polyester defined in i).

2. A composition according to claim 1 wherein the alkali metal is sodium or potassium.

3. A composition according to claim 1 wherein the base resin and the polyester salt comprises polyethylene terephthalate.

4. A process for manufacturing a heat stable article having excellent barrier and optical properties, said process comprising the steps of:

a) thermoforming the composition of claim 1; and b) annealing or heat-setting the thermoformed material under restraint.

* * * * *